United States Patent [19]

Kakizaki et al.

[11] Patent Number: 4,612,472
[45] Date of Patent: Sep. 16, 1986

[54] REMOTE CONTROLLED TOY UTILIZING PIEZOELECTRIC ELEMENT

[75] Inventors: Katsumi Kakizaki; Yutaka Ajiro, both of Tokyo, Japan

[73] Assignee: Tomy Kogyo Co. Inc., Tokyo, Japan

[21] Appl. No.: 664,597

[22] Filed: Oct. 25, 1984

[30] Foreign Application Priority Data

Oct. 27, 1983 [JP] Japan ............................ 58-165421[U]

[51] Int. Cl.$^4$ ............................................. H01L 41/08
[52] U.S. Cl. ..................................... 310/339; 310/323; 310/319; 446/175; 446/454
[58] Field of Search ....................... 310/339, 319, 323; 446/454, 175

[56] References Cited

U.S. PATENT DOCUMENTS

| 2,928,052 | 3/1960 | Wood | 310/339 X |
| 3,270,283 | 8/1966 | Ikrath | 310/339 X |
| 3,310,983 | 3/1967 | Boulais et al. | 310/339 X |
| 3,829,737 | 8/1974 | Johnsson | 310/339 X |
| 3,866,069 | 2/1975 | Ishii et al. | 310/339 |
| 3,878,521 | 4/1975 | Licitis | 343/225 |
| 3,949,248 | 4/1976 | Duffner et al. | 310/339 |
| 3,961,441 | 6/1976 | Sato | 446/175 |
| 4,080,602 | 6/1978 | Hattori et al. | 343/225 |
| 4,085,542 | 4/1978 | Mitamura | 446/175 |
| 4,139,792 | 2/1979 | Kondo | 310/339 |

Primary Examiner—Mark O. Budd
Attorney, Agent, or Firm—K. H. Boswell

[57] ABSTRACT

A remote control toy has a main housing and a remote housing. A radio receiver is located in the main housing for receiving transmitted radio signals. The main housing includes a plurality of elements moveably mounted thereon which are set in motion by a motor in response to receipt of transmitted radio signals by the radio receiver. The remote housing incorporates a radio transmitter. The transmitter includes an electrical circuit having an antenna, a piezoelectric element for generating a current and an electrical component which is capable of generating a radio frequency signal in response to current flow through the electrical circuit. The remote housing further includes a moving member which is moved by the operator of the toy. The moving member is associated with the piezoelectric element to impact a mechanical force on the piezoelectric element for generation of an electrical current in the electrical circuit.

8 Claims, 7 Drawing Figures

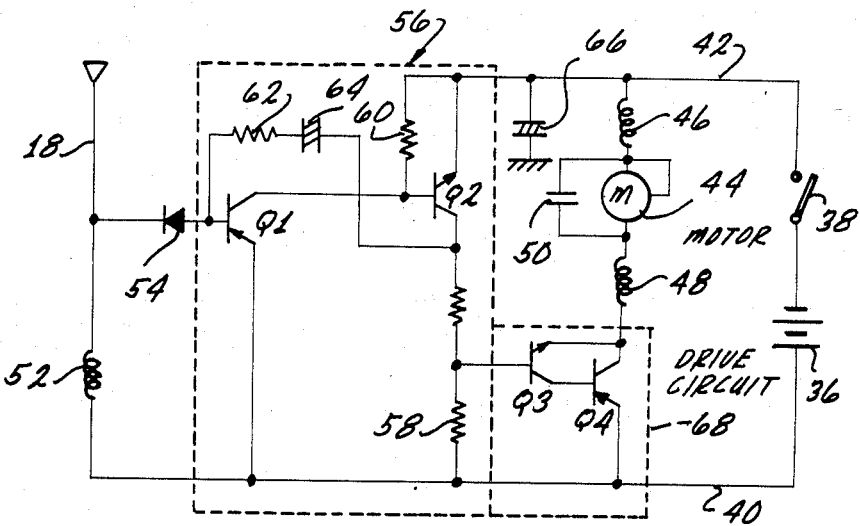
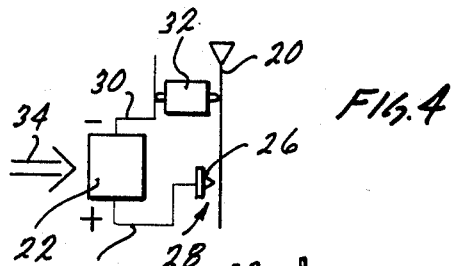
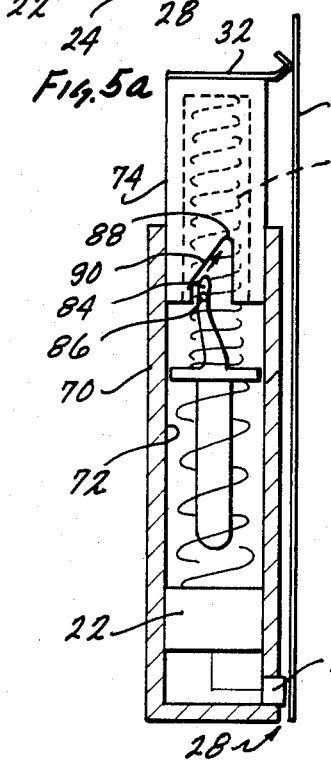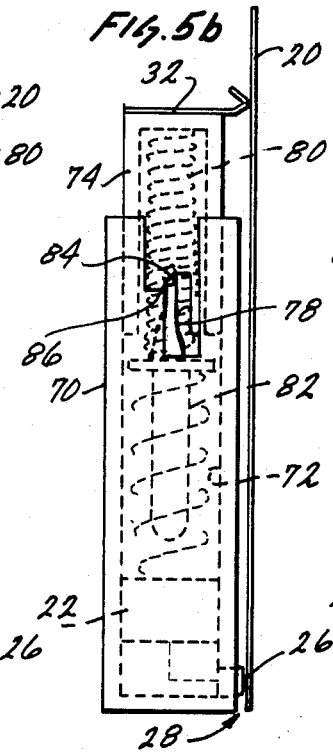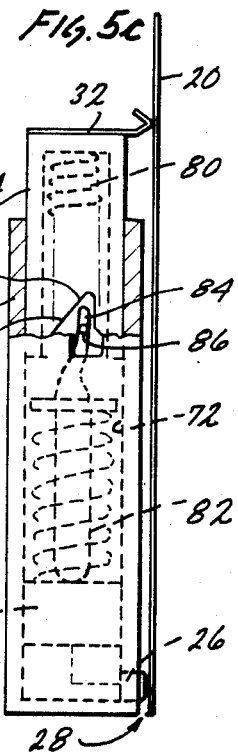

REMOTE CONTROLLED TOY UTILIZING PIEZOELECTRIC ELEMENT

CROSS REFERENCE TO RELATED APPLICATION

This application is related to my application entitled Flywheel Controlled Toy, Ser. No. 664,567, which is being concurrently filed with this application on Oct. 25, 1984. The entire contents of my concurrently filed application entitled Flywheel Controlled Toy is herein incorporated by reference.

BACKGROUND OF THE INVENTION

This invention is directed to a remote control toy which utilizes a piezoelectric element and a transmitter for the production of an RF signal. The receiver is housed in a toy body with a motor within the toy body controlled by the receiver.

A variety of remote control vehicles are known. Utilized as medium for effective remote control are sound waves and electro magnetic radiation such as light radiation and radio frequency radiation. For the most part, remote control toys are generally of a vehicular type. The remote control is utilized to start, stop or steer the vehicular type toy.

Sound or sonic waves generally include a hand held sound wave generator to transmit sound waves to the remote controlled vehicle which includes a sonic transducer located thereon for receipt of the sound waves. An electrical signal is then fed by the sonic transducer into a circuit which controls the operation of the vehicle. In a similar manner, in certain toy vehicles and in certain games, light is utilized as a control signal between a hand held transmitter and the remote controlled vehicle or other device. Normally on the vehicle or other device, a photocell is positioned so as to be able to receive the light signals and in response thereto generates a signal which is then fed into electronic circuit for operation of the toy.

Radio frequency signals have been utilized in a variety of remote controlled toys, vehicles and the like. A number of different operational modes are utilized for these vehicles, toys, and the like. The simplest type vehicle or toy utilizes a single channel radio receiver for off and on control, steering or the like. More sophisticated devices utilize multi channel or utilize modulated signals on single channels. Utilizing these different modes of operation, toy vehicles are known which can be steered right and left, and can be controlled with regard to moving forward, moving reverse, or stopping.

Certain toy vehicles utilize the absence or the presence of a radio signal to effect control of the toy. Thus, in one toy vehicle, the vehicle moved forward upon receipt of this signal, and stops and reverses upon the absence of this signal.

For all of the above known radio frequency controlled toys, two separate power supplies are utilized. The first power supply is utilized in the transmitter, and the second power supply is utilized in the receiver. One of the benefits of a sound or sonic controlled remote controlled toy over a radio frequency remote controlled toy, is the possibility of simply using a mechanical movement to produce the sounds or sonic waves in the transmitter. This eliminates the necessity of incorporating batteries or other power supply in the transmitter. Insofar as remote controlled toys are totally inoperable, and therefore have little play value when their "batteries are dead", it is considered advantageous to be able to eliminate having to incorporate a power supply into the transmitter portion of the remote control vehicle.

BRIEF DESCRIPTION OF THE INVENTION

In view of the above, it is a broad object of this invention to provide a remote control toy having a transmitter portion and a receiver portion which does not have to rely upon the use of batteries, transformers, or other types of power supplies in the transmitter portion of the toy. It is a further object of this invention to provide a remote controlled toy which is simple in operation, and thus usable by a variety of age groups of children and adults in a manner which is both entertaining and educational over the broad spectrum of these age groups. It is a further object of this invention to provide a remote controlled toy which, because of its engineering principles incorporated therein, is capable of a long and useful life time, yet can be manufactured and produced at an economical price and, thus, be widely available to the consumer.

These and other objects, as will become evident in the remainder of this specification, are achieved in a remote control toy which comprises; a main housing; a remote housing, said remote housing independent of said main housing; receiver means mounted on said main housing, said receiver means for receiving a transmitted radio signal; motion output means mounted on said main housing, said motion output means for producing a motion in response to receipt by said receiver means of a transmitted radio signal; transmitter means mounted on said remote housing; said transmitter means including an electrical circuit, said electrical circuit including a transmitting antenna, a piezoelectric element and means for generating a radio frequency signal in response to current flow; said remote housing further including a moving means capable of being acted on by an operator of said toy and in response to said action said moving means moving against said piezoelectric element so as to cause said piezoelectric element to output an electrical current in said electrical circuit.

Further, these objects are achieved by incorporating a spark gap within the electrical circuit of the transmitter means so as to generate the radio frequency signal. Further, by including a moveable striking element as a part of the moving means, it is capable of being biased toward the piezoelectric element. The piezoelectric element can be easily stimulated to produce a current for passing across the spark gap for generation of the radio frequency signal.

The remote housing can include a first portion and a second portion, with the second portion moveable with respect to the first portion. When so constructed, the piezoelectric element would be attached to the first portion with the striking member responding to movement of the second portion such that upon movement of the second portion with respect to the first portion, the striking member would be biased toward the piezoelectric element to generate a current. The biasing element can comprise a spring which is compressed upon movement of the second portion with respect to the first portion.

The objects of the invention are further achieved by including a motor means and a power source means as a portion of the motion output means mounted on the main housing. The power means would supply power to the motor so as to activate the same, and the radio receiver means would include a receiver circuit which is electrically connected to the motor so as to control power supplied to the motor. In this way, motion of the motor is controlled by the receiver circuit in response to a signal transmitted from said remote housing.

BRIEF DESCRIPTION OF THE DRAWINGS

This invention will be better understood when taken in conjunction with the drawings wherein:

FIG. 3 is an electrical schematic of certain elements located in the component on the right hand side of FIG. 1;

FIG. 4 is an electrical schematic of components located in the left hand element of FIG. 1; and FIG. 5 is an elevational in section showing detailed construction of certain of the components seen in FIG. 2.

This invention utilzes certain principles and/or concepts as are set forth in claims apended hereto. Those skilled in the toy arts realize that these principles and/or concepts are capable of being applied to a variety of embodiments which may differ from the exact embodiment utilized for illustrative purposes herein. For this reason, this invention is not to be construed as being limited solely to the illustrative embodiment but should only be construed in view of the claims.

DETAILED DESCRIPTION OF THE INVENTION

Figure 1:
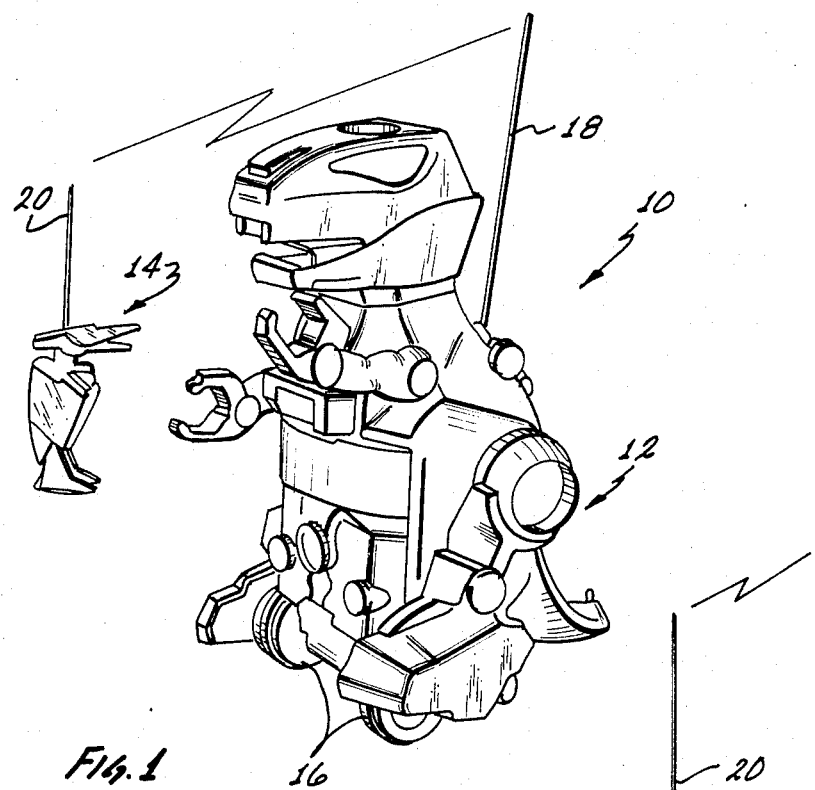
FIG. 1 is an isometric view of two components of a remote controlled toy embodying the principles of this invention.

In FIG. 1 there is shown a remote controlled toy 10 having a first or main component 12 and a second or a remote component 14. A radio transmitter, hereinafter identified, is located within the remote component 14, and a radio receiver, also hereinafter identified, is located within the main component 12. A radio frequency signal is broadcast from the remote component 14 and picked up or received by the main component 12 to control the operation of the main component 12.

The mechanical construction of the main component 12 is, as shown in my co-pending application, entitled Flywheel Controlled Toy, concurrently filed with this application, on Oct. 25, 1984, Ser. No. 664,567. The entire contents of which are herein incorporated by reference.

Basically, the main component 12 is a wheeled vehicle type component which has an outside motif which is a cross between a machine and a dinosaur. This gives it a somewhat futuristic looking appearance. In any event, it includes a small electric motor hereinafter identified, which is utilized to drive certain moveable components on the component 12 including main drive wheels collectively identified by the numeral 16. Appropriate batteries, also hereinafter identified, are located within the main component 12 to supply power to its motor for operation of the same.

The main component 12 includes a drive mechanism as is identified in my application entitled Flywheel Controlled Toy, Ser. No. 664,567, which is shifted each time the motor within the main component 12 is temporarily slowed down or stopped. The invention described in this specification is directed to the control of this motor, and not to those components which are driven by the output of the motor. That portion of the remote control toy 10 constitutes the subject matter of my application Ser. No. 664,567, entitled Flywheel Controlled Toy.

Exposed out of main component 12 is a receiving antenna 18. Exposed out of remote component 14 is a transmitting antenna 20. These, as well as several other components, will be identified utilizing the same numeral in reference to both the physical component in FIGS. 1, 2 and 5, and the electrical symbol in the electrical schematic of FIGS. 3 and 4.

In reference now to FIGS. 3 and 4, the electrical circuits of the main component 12 are shown in FIG. 3 and of the remote component 14 shown in FIG. 4. The electrical transmitter seen in FIG. 4 which is located within the remote component 14, includes, in addition to the transmitting antenna 20, a piezoelectric element 22. An electrical lead 24 connects the positive side of the piezoelectric element 22 to a point 26. The point 26 is located in association with the antenna 20. However, it is not physically touching the same. The point 26 is spaced away from the antenna 20 so as to create a spark gap 28 between the two. A further electrical lead 30 leads from the negative side of the piezoelectric element.

A sliding contact 32 maintains a circuit between the antenna 20 and the electrical lead 30. The need for the sliding contact 32 will be evident when the mechanical components shown in FIG. 5, which are equivalent to the electrical schematic of FIG. 4, are described. In any event, when mechanical pressure, as indicated by the arrow 34 in FIG. 4, is applied to the piezoelectric element 22, a current is generated. The current in traversing the circuit seen in FIG. 4 must jump across the spark gap 28 between the point 26 and the antenna 20. The circuit is then completed across antenna 20 to the electrical lead 30 via the sliding contact 32.

The spark in jumping across the spark gap 28 sets up a radio frequency signal in the antenna 20 which is transmitted from the antenna 20. While this signal is of a small magnitude, it is of a sufficient magnitude so as to be broadcast for several meters allowing for separation of the remote component 14 from the main component 12 a sufficient distance so as to allow for creativity in use of the remote control toy 10.

Referring now to FIG. 3, the circuit for the receiver located in the main component 12 is shown. It includes a battery 36 having one of its terminals connected to one side of an off/on switch 38. The other terminal of the battery 36 is connected to a bus 40. The other side of on/off switch 38 is connected to a bus 42. A transistor Q4 has it's emitter connected to bus 40. A motor 44 is connected to bus 42 through a coil 46 and connected to the collector of Q4 through a coil 48. A capacitor 50 is placed in parallel with the motor 44.

A further transistor Q3 has it's base connected to bus 40 through a resistor 58. The emitter of Q3 is common with the collector of Q4, and the collector of Q3 is connected to the base of Q4. Normally, Q3 is on, which in turn drives Q4 on so as to complete the circuit through the motor 44 to the battery 36.

The antenna 18 of the main component 12 feeds a tuning coil 52 which attaches to bus 40. The cathode of a diode 54 is connected to the antenna 18. A one shot amplifier 56 includes transistors Q1 and Q2. The base of Q1 is connected to the anode of diode 54 with the emitter of Q1 connecting to bus 40. The collector of Q1 feeds the base of Q2 with the emitter of Q2 connected to bus 42 and the collector of Q2 connecting through resistor 58 to the base of Q3. A resistor 60 is connected across the base of Q2 to the bus 42 with a resistor 62 and a capicitor 64 connecting across the base of Q1 to the junction point of the collector of Q2 and resistor 58 to complete the one shot amplifier 56.

The bus 42 is grounded through a capacitor 66. Together Q3 and Q4 serve as a control means 68 for the operation of the motor 44.

As was noted above, when the switch 38 is switched to the on position, Q3 and Q4 are driven on, allowing for completion of the circuit through the motor 44 to drive the same. Upon receipt of a radio frequency signal, at the antenna 18, Q1 is switched from an off state to an on state, and in turn, it switches on Q2 from an off state to an on state. This effectively shunts out the base of Q3 switching it to an off state, which in turn switches Q4 off which then disrupts the circuit through the motor 44 to switch the motor 44 off. Upon loss of the radio frequency signal at the antenna 18, Q1 goes off switching off Q2 to disrupt the shunt across the base of Q3, allowing Q3 and Q4 to switch back on to once again complete the circuit through the motor 44 to turn it back on.

Motor 44 is, therefore, turned off and on depending upon the presence of a signal at antenna 18 to turn the motor 44 off and the absence of a signal at antenna 18 to turn the motor 44 on. Effective control of the motor 44 is achieved by the output of a radio frequency signal from the remote component 14 which results from the current generated by the piezoelectric element 22 upon a mechanical stimulation of the same.

Referring now to FIG. 5, the mechanical components which result in current production by the piezoelectric element 22 are shown. A housing 70 is located within the interior of the remote component 14. The housing 70 has a hollow interior 72 which serves as a channel for a hollow boss 74. A shoulder 76 is formed on an inside wall of the interior of the housing 70. Extending below the shoulder 76, on the same interior wall, is a slot 78.

A compression spring 80 is located within the boss 74. A striking element 82 having a narrow upper section 84 is positioned with the section 84 fitting within the interior of the compression spring 80. It, further, includes a small projection 86 which is sized to allow it to rest on the shoulder 76 or to slide down within the slot 78. The projection 86 is formed on one side of the striking member 82, such that the centering action of the spring 80 fitting over the upper section 84 of the striking element 82, tends to position the striking element 82 within the center of the interior of the boss 74 to locate projection 86 over the shoulder 76.

The hollow boss 74 includes a cutout 88 which has a slanted upper wall 90. The cutout 88 allows for the extension of the projection 86 of the striking element 82 outside of the boss 74 so as to rest either on the shoulder 76 or to ride within the slot 78. Upon depression of the boss 74 into the interior 72 of the housing 70, initially the compression spring 80 transfers downward movement to the striking element 82. However, this movement is immediately halted by locking of the projection 86 onto the shoulder 76. Further depression of the boss 74 serves to compress the spring 80. When the boss 74 has descended from the position seen in FIG. 5A to the position seen in FIG. 5B, the slanted upper wall 90 of the boss 74 meets against the projection 80 and urges the projection 80 to the right such that it is slid off the shoulder 76 and allowed to descend into the slot 80. However, at this time, the compression spring 80 has been sufficiently compressed so as to introduce considerable bias therein, such that as soon as the projection 86 is freed from the shoulder 76, the striking element 82 is rapidly pushed downwardly by the force stored in this compression spring 80.

Referring now to FIG. 5C, under the influence of the bias of compression spring 80, the striking element 82 is forced downwardly against the piezoelectric element 22 such that it strikes it with a force sufficient to induce the piezoelectric element 22 to generate a current.

The sliding contact 32 makes an electrical contact with the compression spring 80. The compression spring 80 in turn makes an electrical contact with the striking element 82. All of these elements are formed of a material which is capable of conducting an electrical current. The striking element 82 strikes a surface of the piezoelectric element 22 which includes the anode of the piezolectric element 22 located thereon. This allows for completion of a circuit from the piezoelectric element 22 to the sliding contact 32.

Upon striking of the piezoelectric element 22, a current is generated and is fed to the contact point 26. A spark jumps across the spark gap 28 to the antenna 20 with the circuit completed through the sliding contact 32, the spring 80, and the striking element 82 back to the piezoelectric element 22.

Figure 2:
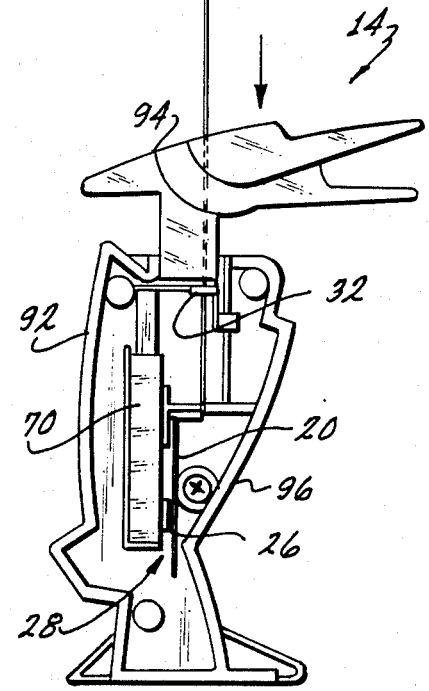
FIG. 2 is an elevational view of the left hand component of FIG. 1 with a covering element removed for clarity of their parts.

Referring now to FIG. 2, it can be seen that the remote component 14 has a first housing portion 92 in the shape of a birdlike body, and a second housing portion 94 in the shape of a birdlike head. The housing 70 is fixed within the interior of the first portion 92 as is the antenna 20. The sliding boss 74 makes contact with the second portion 94 of the component 14, and moves in conjunction with it. The second portion 94 is moveable with respect to the first portion 92 by compression downwardly on the top of the birdlike head towards the body portion 92. The sliding contact 32 is connected to the portion 94 and, therefore, moves in conjunction with it and the boss 74. At all times the contact 32 slides against the antenna 20 to form an electrical connection between the antenna 20 and the anode size of the piezoelectric element 22.

The bottom end of the antenna 20 includes a 360 degree turn such that a screw 96 can be passed through it so as to fixedly attach the bottom portion of the antenna 20 in a fixed relationship with the housing 70 so as to accurately form the spark gap 28.

It is evident that upon each depression of the head or second portion 94 of the remote component 14 toward the body or first portion 92 of the same, that a spark is generated in the spark gap 28. This results in transmitting of a radio frequency signal from the antenna 20. As was noted above, when this signal is picked up by the antenna 18 on the main component 12, the motor 44 within the main component 12 is temporarily taken out of circuit so as to stop operation of the same. This results in control of the main component 12 by the remote comonent 14.

Since the spark across the spark gap is of a limited duration, the radio frequency signal transmitted by the antenna 18 is also of a limited duration. Because of this, power to the motor 44 in the main component 12 is only temporarily interrupted.

We claim:
1. A remote control toy which comprises:
a main housing a remote housing, said remote housing independent of said main housing;

receiver means mounted on said main housing, said receiver means for receiving a transmitted spark radio signal;

motion output means mounted on said main housing, said motion output means for producing a motion in response to receipt by said receiver means of said transmitted spark radio signal;

transmitter means mounted on said remote housing;

said transmitter means including an electrical circuit, said electrical circuit including a transmitting antenna, a piezoelectric element and spark gap means for producing a spark in said electrical circuit in response to an electrical current flow and for providing said spark radio signal responsive to said spark;

said remote housing further including a moving means capable of being acted on by an operator of said toy and in response to said action said moving means moving against said piezoelectric element so as to cause said piezoelectric element to generate said electrical current flow in said electrical circuit.

2. The toy of claim 1 wherein:
said moving means includes a striking element moveably mounted in said remote housing in association with said piezoelectric element;
said moving means further including a biasing means associated with said striking element so as to bias said striking element toward said piezoelectric element.

3. The toy of claim 2 wherein:
said moving means further includes retaining means associated with said striking element, said retaining means for holding said striking element in a first position against the bias of said biasing means and releasing said striking elements so as said striking element is biased by said biasing means toward said piezoelectric element.

4. The toy of claim 1 wherein:
said moving means includes a striking element moveably mounted in said remote housing in association with said piezoelectric element;
said moving means further including a biasing means associated with said striking element so as to bias said striking element toward said piezoelectric element.

5. The toy of claim 4 wherein:
said moving means further includes retaining means associated with said striking element, said retaining means for holding said striking element in a first position against the bias of said biasing means and releasing said striking elements so as said striking element is biased by said biasing means toward said piezoelectric element.

6. The toy of claim 1 wherein:
said remote housing includes a first portion and a second portion, said second portion moveably mounted on said first portion;
said piezoelectric element mounted on said first portion;
said moving means operatively associated with said second portion, said moving means moving against said piezoelectric element in response to movement of said second portion with respect to said first portion.

7. The toy of claim 6 wherein:
said moving means includes a striking element moveably mounted in said remote housing in association with said piezoelectric element;
said moving means further including a biasing means associated with said striking element so as to bias said striking element toward said piezoelectric element;
said moving means further includes retaining means associated with said striking element, said retaining means for holding said striking element in a first position against the bias of said biasing means and releasing said striking elements so as said striking element is biased by said biasing means toward said piezoelectric element;
said biasing means comprising a spring associated with said second portion, said second portion moving with respect to said first portion compressing said spring, said spring associated with said striking element so as when said spring is compressed said spring is capable of biasing said striking element towards piezoelectric element.

8. The toy of claim 1 wherein:
said motion output means includes a motor means and a power means, said power means for supplying power to said motor means;
said receiver means includes a receiver circuit, said receiver circuit electrically connected to said motor means so as to control said motor means.

* * * * *

UNITED STATES PATENT AND TRADEMARK OFFICE
CERTIFICATE OF CORRECTION

PATENT NO. : 4,612,472

DATED : SEPT. 16, 1986

INVENTOR(S) : KATSUMI KAKIZAKI AND YUTAKA AJIRO

It is certified that error appears in the above-identified patent and that said Letters Patent is hereby corrected as shown below:

Column 3, line 23, after "elevational" insert --view--.

Column 6, line 60, "comonent" should read --component--.

Column 8, lines 6 and 32, "elements" should read --element--.

Signed and Sealed this

Fourteenth Day of April, 1987

Attest:

DONALD J. QUIGG

Attesting Officer

Commissioner of Patents and Trademarks